United States Patent
Hwang et al.

(10) Patent No.: US 8,031,814 B2
(45) Date of Patent: Oct. 4, 2011

(54) APPARATUS AND METHOD FOR ESTIMATING CHANNEL IN MULTI ANTENNA WIRELESS COMMUNICATION SYSTEM

(75) Inventors: Suk-Seung Hwang, Yongin-si (KR); Joo-Hyun Lee, Suwon-si (KR); Sang-Boh Yun, Seongnam-si (KR); Yong-Soo Cho, Seoul (KR); Jae-Kwon Kim, Wonjoo-si (KR); Kyu-In Lee, Seoul (KR)

(73) Assignees: Samsung Electronics Co., Ltd., Suwon-si (KR); Chung-Ang University Industry-Academy Cooperation Foundation, Seoul (KR)

( * ) Notice: Subject to any disclaimer, the term of this patent is extended or adjusted under 35 U.S.C. 154(b) by 949 days.

(21) Appl. No.: 12/004,721

(22) Filed: Dec. 21, 2007

(65) Prior Publication Data

US 2008/0214115 A1 Sep. 4, 2008

(30) Foreign Application Priority Data

Dec. 22, 2006 (KR) ........................ 10-2006-0133069

(51) Int. Cl.
*H04L 27/06* (2006.01)

(52) U.S. Cl. ........ 375/340; 375/260; 375/262; 375/341; 375/346; 375/349

(58) Field of Classification Search .................. 375/340, 375/260, 262, 346, 349, 341
See application file for complete search history.

(56) References Cited

U.S. PATENT DOCUMENTS

| | | | |
|---|---|---|---|
| 2002/0150037 A1* | 10/2002 | Bao et al. | 370/208 |
| 2007/0116157 A1* | 5/2007 | Kimura et al. | 375/341 |
| 2008/0101483 A1* | 5/2008 | Aziz | 375/260 |

FOREIGN PATENT DOCUMENTS

KR 10-2004-0077576 9/2004

OTHER PUBLICATIONS

Office Action dated Sep. 9, 2009 in connection with Korean Patent Application No. 2007-135657.
Bin Dong, et al., "A New Class of Soft MIMO Demodulation Algorithms", IEEE Transactions on Signal Processing, vol. 51, No. 11, Nov. 2003, p. 2752-2763.

* cited by examiner

*Primary Examiner* — Kabir A Timory (57) ABSTRACT

The present invention relates to an apparatus and method for estimating a channel in a wireless communication system. The apparatus according to the present invention includes an estimator for initially estimating a channel response value by using a predetermined signal among reception signals, a detector for detecting transmission signals by using the channel response value and an operator for updating the channel response value by using detected transmission signals, a detection accuracy and reception signals.

18 Claims, 3 Drawing Sheets

APPARATUS AND METHOD FOR ESTIMATING CHANNEL IN MULTI ANTENNA WIRELESS COMMUNICATION SYSTEM

CROSS-REFERENCE TO RELATED APPLICATION(S) AND CLAIM OF PRIORITY

This application claims the benefit under 35 U.S.C. §119 (a) to a Korean patent application filed in the Korean Intellectual Property Office on Dec. 22, 2006 and assigned Serial No. 2006-133069, the entire disclosure of which is hereby incorporated by reference.

TECHNICAL FIELD OF THE INVENTION

The present invention relates generally to a multi antenna wireless communication system, and more particularly, to an apparatus and method for estimating a channel in a multi antenna wireless communication system.

BACKGROUND OF THE INVENTION

Generally, a channel estimation method in a wireless communication system is classified into a training-based channel estimation method using a preamble signal or a pilot signal, a semi-blind method additionally using a data signal after using properties of the preamble signal, the pilot signal or other predetermined signals, and a blind method using only a received data signal without predetermined signals.

If the blind method is employed, a throughput due to channel estimation is not deteriorated since additional signals are not used. However, the blind method uses properties of the received signal only, thus reducing channel estimation performance, especially in the case of rapid change in channels. Regarding the training-based method, as it uses the predetermined signals, it provides the best channel estimation performance but requires additional signals in proportion to the number of transmission antennas. Hence, it has a problem that the throughput tends to deteriorat according to the increased number of transmission antennas or according to the enhancement of estimation performance. Meanwhile, as the semi-blind method estimates a channel by using the data signal together with the preamble signal or the pilot signal, additional overhead due to the enhancement of channel estimation performance does not occur and therefore the throughput is not reduced.

An accurate channel estimation is required to detect multiple signals or to effectively remove an interference signal of a neighboring cell in a multi antenna wireless communication system or a cellular system having a frequency reuse rate of 1. In the multi antenna wireless communication system, a terminal using a plurality of reception antennas uses a channel response in order to classify signals generated by spatial multiplexing or space-time coding from a plurality of transmission antennas. In the cellular system having the frequency reuse rate of 1, a terminal at a cell boundary has a difficulty in receiving multiple signals from a serving base station due to an interference signal from a neighboring base station and the channel deterioration with the serving base station. Thus, the base station generally transmits the same data to the terminal at the cell boundary through a plurality of transmission antennas to thereby improve reliability in signal reception of the terminal. In this case, the terminal at the cell boundary determines the interference signal of the neighboring base station and the signal from the serving base station as the multiple signals transmitted by a transmission terminal employing the plurality of transmission antennas virtually and employs an interference removal technique, thereby removing the interference signal from the neighboring base station.

For example, the semi-blind method includes expectation maximization (EM) and decision directed (DD). The EM is a method of estimating a channel response which is in the closest proximity to a received data signal in probability. The DD is a method of detecting a channel response estimated by an initial pilot signal or a preamble signal and then updating the detected channel response according to a channel change by using a received data signal. That is, the DD method considers the detected signal as a transmitted signal and estimates a channel change by applying a general channel estimation method. An area which satisfies coherence time and coherence bandwidth having an equal channel response is formed as a group. If the number of data sub-carriers in the group is larger than that of pilot or preamble signals, it can be expected to enhance channel estimation performance with noise mean effects. However, if a multiple input multiple output (MIMO) signal is not correctly detected, it has a problem of deteriorating the channel estimation performance because it estimates a channel with the incorrect information.

The EM method improves channel estimation performance by using the initially-estimated channel response and the received data signal. According to the EM, it is assumed that each signal in a constellation is transmitted with the same probability. The EM estimates a channel by accumulating the values obtained by multiplying the respective channel responses assuming each constellation point as a transmission signal, by a weight value according to a distance between the received signal and the respective constellation points. Here, since all constellation points are used, if the number of the transmission antennas or the number of the neighboring base stations is T and the number of the constellation points is $|C|$, the EM estimates a $|C|T$ number of channel responses, which is highly complicated. On the assumption that noises added to each data signal are based on the same Gaussian distribution, each data signal is accumulated by the same weight. However, the noise property of the data signals may not be identical in a moment although it is identical statistically. Therefore, it is not preferable to assign the same weight. In the MIMO system, a signal which is received through a single reception antenna is represented by a combination of the channel responses multiplied by the T number of transmission signals, and noises. That is, since T numbers of channel responses are estimated by using the probability value of the data signal which is not orthogonal, the optimal result (i.e., the accurate channel response) is not obtained.

SUMMARY OF THE INVENTION

To address the above-discussed deficiencies of the prior art, it is a primary object to provide an apparatus and method for estimating a channel in a multi antenna wireless communication system.

Another aspect of the present invention is to provide an apparatus and a method for reducing operational complexity of a semi-blind channel estimation method in a multi antenna wireless communication system.

Still another aspect of the present invention is to provide an apparatus and a method for improving accuracy of channel estimation by using detected transmission signals, a detection accuracy and reception signals in a multi antenna wireless communication system.

According to one aspect of the present invention, a reception terminal apparatus in a wireless communication system includes an estimator for initially estimating a channel response value by using a predetermined signal among reception signals; a detector for detecting transmission signals by using the channel response value; and an operator for updating the channel response value by using detected transmission signals, detection accuracy and reception signals.

According to another aspect of the present invention, a channel estimation method of a reception terminal in a wireless communication system includes initially estimating a channel response value by using a predetermined signal among reception signals, detecting transmission signals by using the channel response value, and updating the channel response value by using reception signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1A:
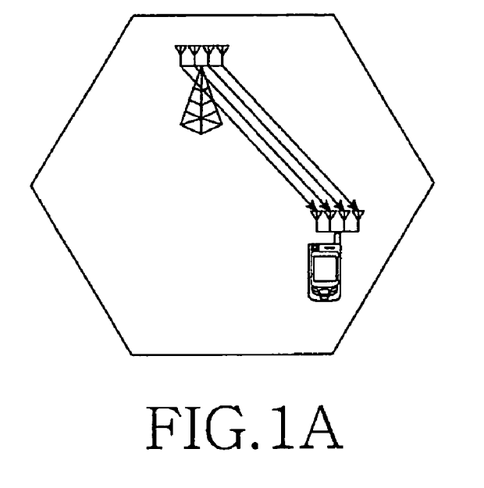
FIGS. 1A and 1B are diagrams illustrating an example of a communication environment of a terminal in a multi antenna wireless communication system.
Figure 1B:
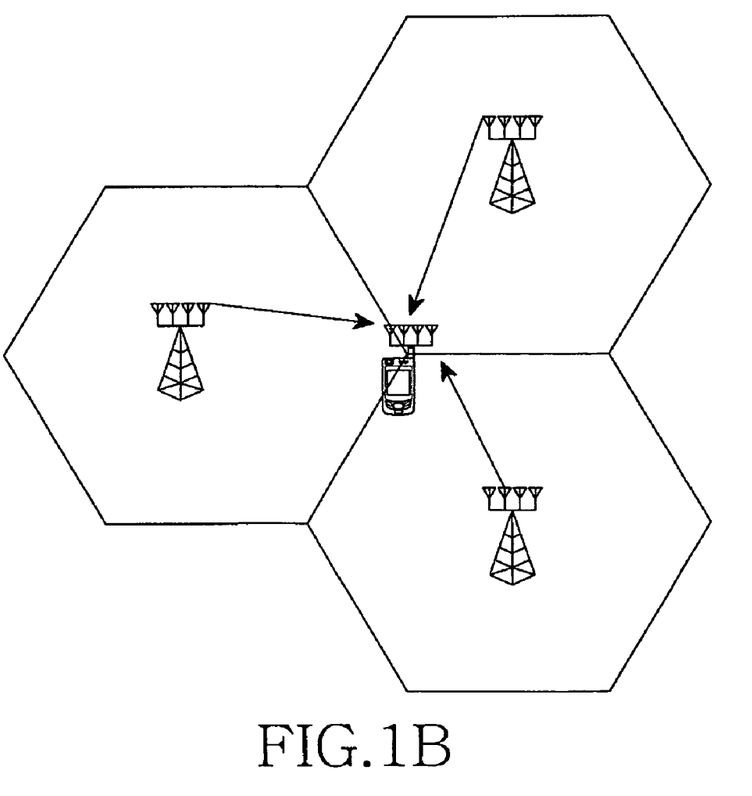
Figure 2:
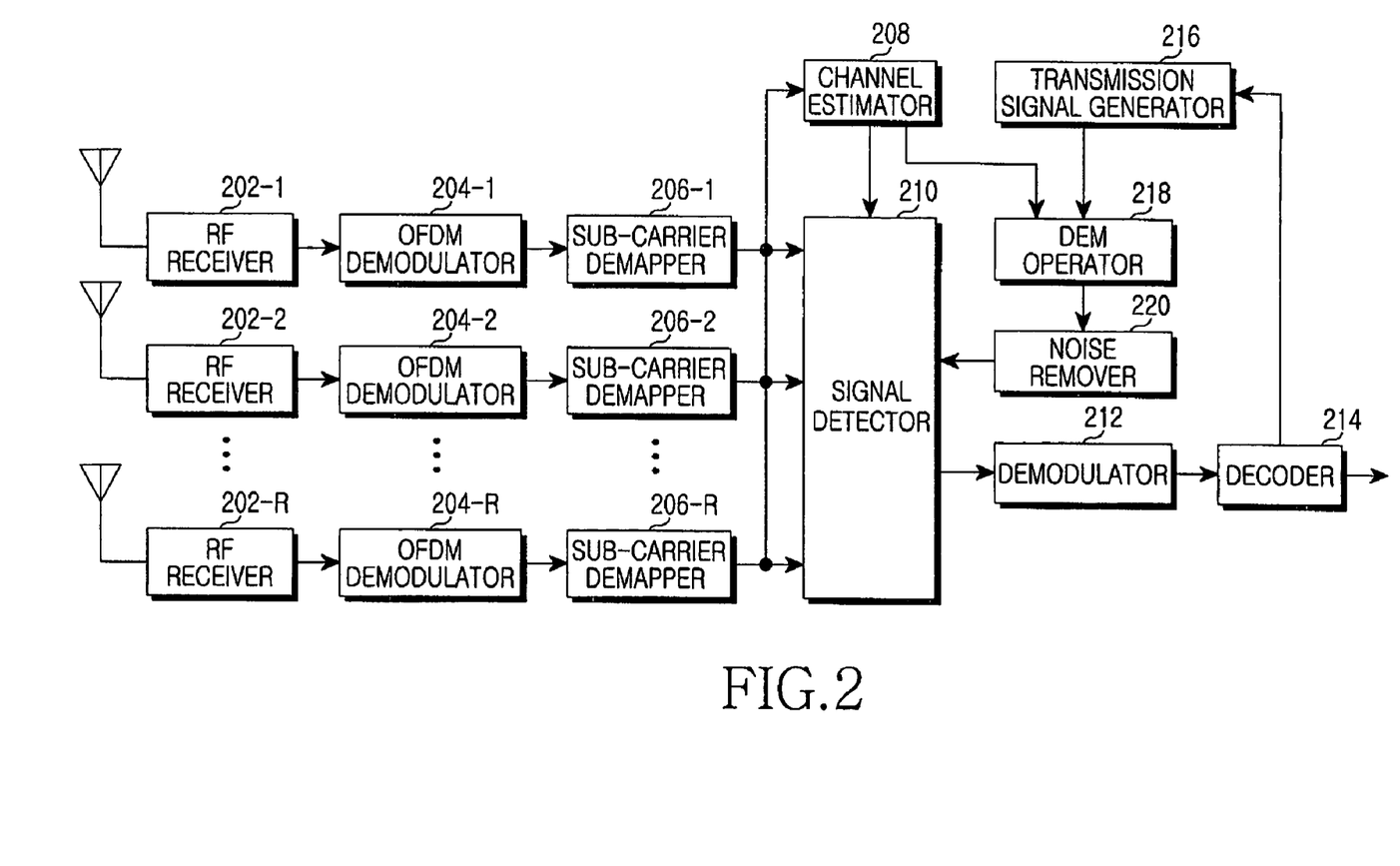
FIG. 2 is a block diagram illustrating a reception terminal in a multi antenna wireless communication system according to an exemplary embodiment of the present invention.
Figure 3:
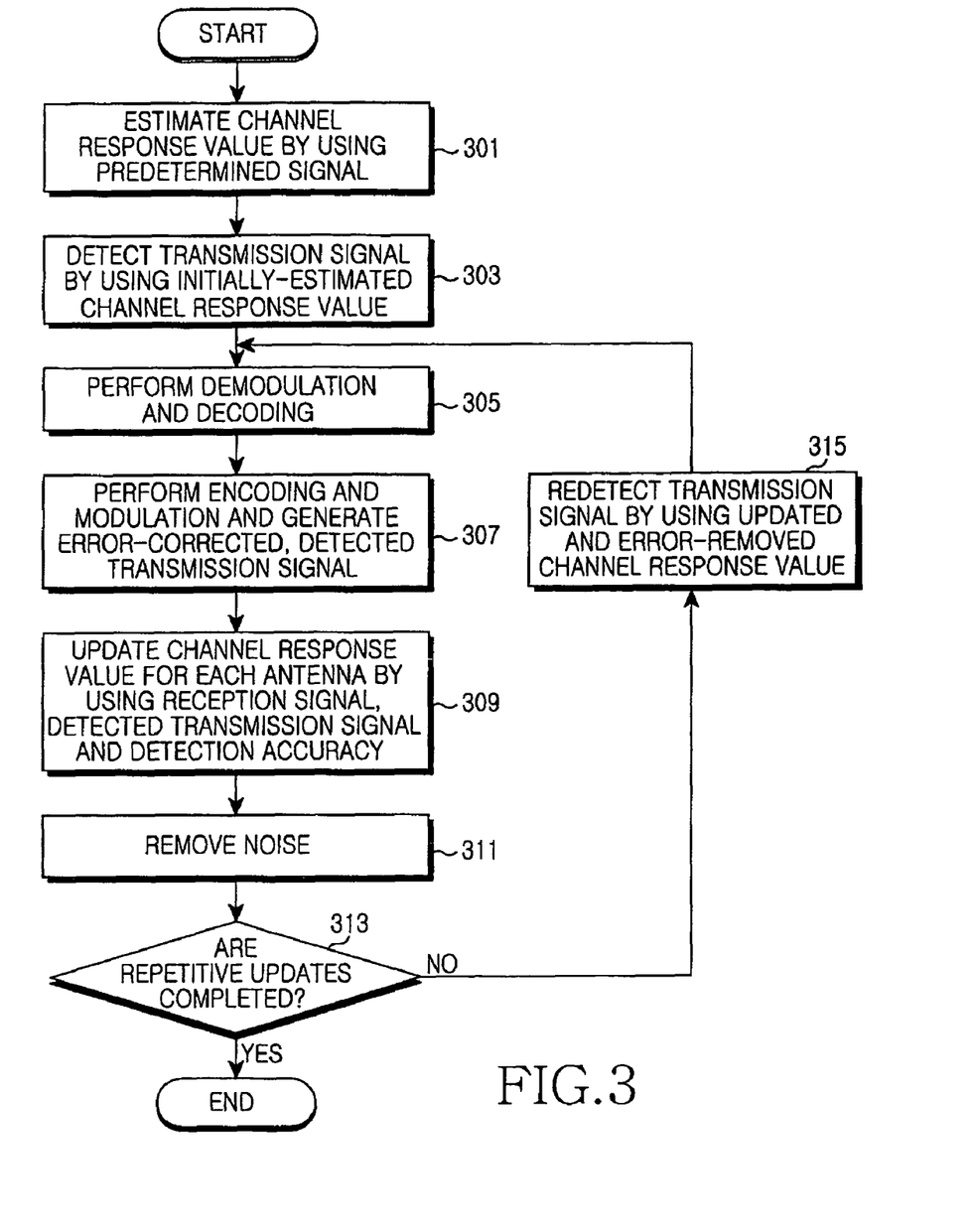
FIG. 3 is a flowchart illustrating a channel estimation procedure of the reception terminal in the multi antenna wireless communication system according to the exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, the present invention provides a method for improving channel estimation performance and reducing operational complexity of a semi-blind method in a multi antenna wireless communication system. The present invention employs an orthogonal frequency division multiplexing (OFDM)-based system for description, but it can also be applicable to a wireless communication system which uses a plurality of transmission and reception antennas. Hereinafter, a channel estimation method according to the present invention is called Decision-directed Expectation Maximization (DEM).

A channel estimation process according to the DEM will be briefly described.

First, a reception terminal performs an initial channel estimation by using a predetermined signal such as preamble and pilot signals. Then, the reception terminal detects signals by using initially-estimated channel information, completes error correction by decoding the detected signals, and generates a transmission signal by using an encoding method and modulation method used by a transmission terminal. Thereafter, the reception terminal calculates a weight value of each reception signal according to a Euclidian distance between the detected transmission signal and the reception signal, and updates the initially-estimated channel information by using a detection value of the transmission signal to which the weight value is applied, and the reception signal.

First, conventional expectation maximization (EM) and decision directed (DD) methods will be described in detail, and then the DEM method of the present invention will be compared with them.

The present invention considers a circumstance in which a signal is transmitted from a base station using T numbers of transmission antennas as shown in FIG. 1A or from T numbers of base stations as shown in FIG. 1B to a terminal using R numbers of reception antennas, and a circumstance in which a signal is transmitted from a terminal using T numbers of transmission antennas to a base station using R numbers of reception antennas. In this case, a reception signal is represented as in Equation 1:

$$Y(k) = H(k)X(k) + N(k) \quad \text{[Eqn. 1]}$$

$$\begin{bmatrix} Y_1(k) \\ Y_2(k) \\ \vdots \\ Y_R(k) \end{bmatrix} = \begin{bmatrix} H_{11}(k) & H_{12}(k) & \cdots & H_{1T}(k) \\ H_{21}(k) & H_{22}(k) & & H_{2T}(k) \\ \vdots & & \ddots & \vdots \\ H_{R1}(k) & H_{R2}(k) & \cdots & H_{RT}(k) \end{bmatrix} \begin{bmatrix} X_1(k) \\ X_2(k) \\ \vdots \\ X_T(k) \end{bmatrix} + \begin{bmatrix} N_1(k) \\ N_2(k) \\ \vdots \\ N_R(k) \end{bmatrix}.$$

In Equation 1, Y(k) refers to a reception signal vector with respect to the kth sub-carrier, H(k) denotes a channel response matrix with respect to the kth sub-carrier, X(k) signifies a transmission signal vector with respect to the kth sub-carrier, N(k) implies a noise vector with respect to the kth sub-carrier, $Y_i(k)$ is a reception signal of the ith reception antenna with respect to the kth sub-carrier, $H_{ij}(k)$ is a channel response value between the ith reception antenna and the jth transmission antenna with respect to the kth sub-carrier, $X_j(k)$ is a transmission signal of the jth transmission antenna with respect to the kth sub-carrier and $N_i(n)$ refers to a noise of the ith reception antenna with respect to the kth sub-carrier.

If an area which satisfies coherence time and coherence bandwidth is configured as a single data block applying identical channel response, all data signals included in the single data block are used to update the channel response matrix. According to the EM, an estimation value of a probabilistic maximum likelihood (ML) channel response using the data signals in the single data block is as in Equation 2:

$$\max_{H_i, \sigma_i^2} f(Yi \mid Hi, x). \qquad [\text{Eqn. 2}]$$

In Equation 2, f(Yi|Hi,x) refers to a conditional probability distribution of Yi when Hi and x are provided, Yi is a signal vector received through the ith reception antenna, Hi is a channel response vector corresponding to the ith reception antenna, x is a transmission signal matrix and $\sigma_i^2$ refers to a noise variance of the ith reception antenna.

In Equation 2, $Y_i$, $H_i$ and x are defined as in Equation 3:

$$Yi = [Y_i^1 \ldots Y_i^D], \qquad [\text{Eqn. 3}]$$
$$x = [X^1, \ldots X^D], X^i = [X_1^i, \ldots, X_T^i]^T,$$
$$H_i = [H_{i1}, \ldots, H_{iT}]$$

In Equation 3, $Y_i$ refers to a signal vector received through the ith reception antenna, $Y_i^D$ refers to the dth data signal received through the ith reception antenna, x is a transmission signal matrix, $X^i$ is a transmission signal vector with respect to the ith reception antenna, $X_T^i$ is the tth transmission signal with respect to the ith reception antenna, $H_i$ is a channel response vector of the ith reception antenna and $H_{ij}$ is a channel response value between the ith reception antenna and the jth reception antenna.

If the transmission signal matrix and the channel response vector are provided as shown in Equation 2, the channel response is determined to have the maximum probability in generation of the reception signal. In this case, it is difficult to estimate the probability value from incomplete data signals mixed with transmission signals from the respective transmission antennas. Hence, in order to easily estimate possible transmission signal combination and the probability value of a reception signal, the probability value is estimated by using a complete conditional probability distribution. The following Equation 4 represents a conditional probability distribution of incomplete data and complete data:

$$\log f(Y_i \mid H_i, x) = \sum_{d=1}^{D} \log f(Y_i^d \mid H_i, X^d) \qquad [\text{Eqn. 4}]$$
$$\log f(Y_i, x \mid H_i) = \sum_{d=1}^{D} \left\{ \log \frac{1}{|C|^T} f(Y_i^d \mid H_i, X^d) \right\}.$$

In Equation 4, $f(Y_i|H_i,x)$ refers to a conditional probability distribution of $Y_i$ when $H_i$ and x are provided, $Y_i$ is a signal vector received through the ith reception antenna, $H_i$ is a channel response vector with respect to the ith reception antenna, x is a transmission signal matrix, D refers to the number of data signals included in a single block, $Y_i^d$ is the dth data signal received through the ith reception antenna, $X^d$ is the dth transmission signal vector, $f(Y_i, x|H_i)$ refers to a conditional probability distribution of x and $Y_i$ when $H_i$ is provided, |C| is the number of points of modulation constellation and T refers to the number of transmission antennas.

If the number of the transmission antennas is T, the generation probability of possible signal combinations is $1/(|C|^T)$, and the operation is simplified by representing the multiplication by addition by using a log function as shown in Equation 4. In addition, as shown in Equation 4, when x and $H_i$ are provided, the probability value of the reception signal is an accumulation of the values obtained by multiplying the probability of $X^d$ corresponding to each data signal by the conditional probability distribution of $Y_i^d$. If the channel response $H_i^P$ which is obtained by $Y_i$ and the pth repetition is determined, the expectation value of log $f(Y_i x|H_i)$ is represented as in Equation 5:

$$Q(H_i \mid H_i^P) = E\{\log f(Y_i, x \mid H_i) \mid Y_i, H_i^P\} \qquad [\text{Eqn. 5}]$$
$$= \sum_{X^d \in \Omega} \sum_{d=1}^{D} \log\left\{\frac{1}{|C|^T} f(Y_i^d \mid H_i, X^d)\right\}$$
$$\frac{f(Y_i^d \mid H_i^P, X^d)}{|C|^T f(Y_i^d \mid H_i^P)}.$$

In Equation 5, $Q(H_i|H_i^P)$ is an expectation value of log $f(Y_i, x|H_i)$ when $Y_i$ and $H_i^P$ are provided, E{ } is an operator of expectation value, $f(Y_i, x|H_i)$ is a conditional probability distribution of x and $Y_i$ when $H_i$ is provided, $Y_i$ is a signal vector received through the ith reception antenna, x is a transmission signal matrix, $H_i$ is a channel response vector with respect to the ith reception antenna, $H_i^P$ is a channel response vector that is updated p times with respect to the ith antenna, $\Omega$ is a set of possible signal combinations, D is the number of data signals included in a single block, |C| is the number of points of modulation constellation, T is the number of transmission antennas, $Y_i^d$ is the dth data signal received through the ith reception antenna, and $X^d$ refers to the dth transmission signal vector.

The respective conditional probability distributions in Equation 5 are expressed as in Equation 6.

$$f(Y_i^d \mid H_i, X^d) = \frac{1}{2\pi\sigma^2} \exp\left\{-\frac{1}{2\sigma^2} |Y_i^d - H_i X^d|^2\right\} \qquad [\text{Eqn. 6}]$$
$$f(Y_i^d \mid H_i^P) = \sum_{X^d \in \Omega} \frac{1}{2\pi\sigma^2 |C|^T} \exp\left\{-\frac{1}{2\sigma^2} |Y_i^d - H_i^P X^d|^2\right\}.$$

In Equation 6, $f(Y_i^d|H_i, X^d)$ is a conditional probability distribution of $Y_i^d$ when $H_i$ and $X^d$ are provided, $Y_i^d$ is the dth data signal received through the ith reception antenna, $H_i$ is a channel response vector with respect to the ith reception antenna, $X^d$ is the dth transmission signal vector, $\sigma^2$ is a noise variance, $\Omega$ is a set of possible signal combinations, |C| is the number of points of modulation constellation and T refers to the number of the transmission antennas.

In the EM, the expectation is a process of estimating Q(·) while maximization is a process of selecting $H_i^P$ to make the estimated Q(·) value converge to the maximum value. The maximum value in the Q(·) probability condition is expressed in Equation 7:

$$\operatorname*{argmax}_{H_i} Q(H_i \mid H_i^P) = \qquad [\text{Eqn. 7}]$$
$$\operatorname*{argmin}_{H_i} \sum_{X^d \in \Omega} \sum_{d=1}^{D} |Y_i^d - H_i X^d|^2 \frac{f(Y_i^d \mid H_i^P, X^d)}{f(Y_i^d \mid H_i^P)}.$$

In Equation 7, $Q(H_i|H_i^p)$ is an expectation value of log $f(Y_i,x|H_i)$, $H_i$ is a channel response vector with respect to the ith reception antenna, $H_i^P$ is a channel response vector that is updated p times with respect to the ith reception antenna, $\Omega$ is a set of possible signal combinations, D is the number of data signals included in a single block, $f(Y_i^d|H_i^P,X^d)$ is a conditional probability distribution of $Y_i^d$ when $H_i^P$ and $X^d$ are provided, $Y_i^d$ is the dth data signal received through the ith reception antenna, $X^d$ is the dth transmission signal vector, $f(Y_i^d|H_i^P)$ is a conditional probability distribution of $Y_i^d$ when $H_i^P$ is provided, and $H_i^P$ is a channel response vector that is updated p times with respect to the ith reception antenna.

The Equation 7 is differentiated with respect to $H_i$ thereby obtaining the $H_i^{p+1}$ estimation formula in Equation 8:

$$H_i^{p+1} = \left[\sum_{d=1}^{D}\sum_{X^d\in\Omega} X^d(X^d)^T \frac{f(Y_i^d|H_i^p, X^d)}{f(Y_i^d|H_i^p)}\right]^{-1} \times \left[\sum_{d=1}^{D}\sum_{X^d\in\Omega} Y_i^d(X^d)^T \frac{f(Y_i^d|H_i^p, X^d)}{f(Y_i^d|H_i^p)}\right]. \quad [\text{Eqn. 8}]$$

In Equation 8, $H_i^{p+1}$ is a channel response vector that is updated p+1 times with respect to the ith reception antenna, D is the number of data signals included in a single block, $\Omega$ is a set of possible signal combinations, $X^d$ is the dth transmission signal vector, $f(Y_i^d|H_i^P,X^d)$ is a conditional probability distribution of $Y_i^d$ when $H_i^P$ and $X^d$ are provided, $Y_i^d$ is the dth data signal received through the ith reception antenna, and $f(Y_i^d|H_i^P)$ is a conditional probability distribution of $Y_i^d$ when $H_i^P$ is provided.

As shown in Equation 8, the probabilistic ML channel estimation is performed by accumulating conditional probability distribution values with respect to $|C|^T$ numbers of transmittable signal combinations. That is, as the EM considers all signal combinations, operation is very complicated. As shown in Equation 6, the expectation value corresponding to the Gaussian distribution is used as a weight value of the estimated channel response value as the noise is based on the Gaussian distribution in the EM. If the signal combination that is assumed to have been transmitted is identical to the actually-transmitted signal, a great weight value is applied to corresponding channel response value. Meanwhile, if the signal combination that is assumed to have been transmitted is a signal that is less likely to be actually transmitted, there occurs an error between the noise and the transmission signal, to increase the Euclidian distance from the reception signal. In this case, therefore, a small weight value is applied to corresponding channel response value.

The DD is used to track a channel change which occurs by movement of a terminal or by change in circumstances. That is, if the DD is used, the channel response is estimated by using a pilot signal or a preamble signal, and is updated by using a data signal included in the same group. The DD is represented in Equation 9:

$$H(m) = Y(m)\tilde{x}^H(m)(\tilde{x}(m)\tilde{x}^H(m))^{-1}$$

$$\tilde{x}(m) = \text{Slice}^{-1}(\text{slice}((H^{init}(m))^+ Y(m))) \quad [\text{Eqn. 9}]$$

In Equation 9, H(m) is a channel response with respect to the mth resource, Y(m) is a reception signal with respect to the mth resource, $\tilde{x}(m)$ is a detection value of a transmission signal with respect to the mth resource, Slice(·) is a demodulation operator, $H^{init}(m)$ refers to a channel response with respect to the mth resource which is initially estimated.

The signal may be detected by a linear or non-linear method. Zero forcing (ZF) is used as an example in Equation 9. As in Equation 9, if the signal is detected by the initially-estimated $H^{init}(m)$, the channel response is updated by using the detected signal. If the number of data signals in a group is larger than that of the reception antennas, a channel response which is more accurate than the initially-estimated channel estimation is obtained due to the noise mean effect using a lot of data signals. However, if there is an error in the detected signal, the channel estimation performance is deteriorated due to the error transmission effect by the detected error.

Hereinafter, the DEM according to the present invention will be described.

The DEM determines a detected signal as a transmission signal, and updates estimated channel response by using a weight value according to a Euclidian distance between the detected signal and a received signal. Here, a conditional probability distribution of the received signal is expressed in Equation 10:

$$Q^{DEM}(H_i|H_i^p) = E\{\log f(Y_i, \tilde{x}|H_i)|\tilde{x}, H_i^p\} \quad [\text{Eqn. 10}]$$

$$= \sum_{d=1}^{D} \log\{f(Y_i^d, \tilde{x}^d|H_i)\} f(Y_i^d|\tilde{x}^d, H_i^p)$$

$$= \sum_{d=1}^{D} \log\{f(Y_i^d|\tilde{x}^d, H_i) f(\tilde{x}^d|H_i)\}$$

$$f(Y_i^d|\tilde{x}^d, H_i^p)$$

$$= \sum_{d=1}^{D} \log\{f(Y_i^d|\tilde{x}^d, H_i)\} f(Y_i^d|\tilde{x}^d, H_i^p)$$

In Equation 10, $Q^{DEM}(H_i|H_i^P)$ is an expectation value of log $f(Y_i,\tilde{x}|H_i)$ when $\tilde{x}$ and $H_i^P$ are provided, $E\{\}$ is an expectation value operator, $f(Y_i,\tilde{x}|H_i)$ is a conditional probability distribution of $Y_i$ and $\tilde{x}$ when $H_i$ is provided, $Y_i$ is a signal vector received through the ith reception antenna, $\tilde{x}$ is an estimation value of a transmission signal matrix, $H_i$ is a channel response vector with respect to the ith reception antenna, $H_i^P$ is a channel response vector that is updated p times with respect to the ith reception antenna, D is the number of data signals included in a single block, $Y_i^d$ is the dth data signal received through the ith reception antenna and $\tilde{x}^d$ is a detection value of the dth transmission signal vector.

Here, if $\tilde{x}^d$ is provided, a conditional probability distribution is expressed in Equation 11:

$$f(Y_i^d|\tilde{x}^d, H_i^p) = \frac{1}{2\pi\sigma^2}\exp\left\{-\frac{1}{2\sigma^2}\left|Y_i^d - H_i^p\tilde{x}^d\right|^2\right\}. \quad [\text{Eqn. 11}]$$

In Equation 11, $f(Y_i^d|\tilde{x}^d,H_i^P)$ is a conditional probability distribution of $Y_i^d$ when $\tilde{x}^d$ and $H_i^P$ are provided, $Y_i^d$ is the dth data signal received through the ith reception antenna, $\tilde{x}^d$ is a detection value of the dth transmission signal vector, $H_i^P$ is a channel response vector that is updated p times with respect to the ith reception antenna and $\sigma^2$ is a noise variance.

The signal detection method may include ML or ZF. The ML or ZF is performed as in Equation 12:

$$ML: X_{ML}^d = \quad [\text{Eqn. 12}]$$

$$\tilde{X}^d = \underset{X^d\in\Omega}{\arg\max} f(Y^d|H, X^d) = \underset{X^d\in\Omega}{\arg\min} \|Y^d - HX^d\|^2$$

$$ZF: X_{ZF}^d = \tilde{X}^d = \text{Slice}^{-1}(\text{Slice}(H(k)^+ Y(k)))$$

In Equation 12, $X_{ML}^d$ is the dth transmission signal vector detected by the ML method, $\tilde{X}^d$ is a detection value of the dth transmission signal vector, $\Omega$ is a set of possible signal combinations, $f(Y^d|H,X^d)$ is a conditional probability distribution of $Y^d$ when H and $X^d$ are provided, $Y^d$ is the dth reception signal vector, H is a channel response matrix, $X^d$ is the dth transmission signal vector, $X_{ZF}^d$ is the dth transmission signal vector detected by the ZF method, Slice(·) is a demodulation operator, Y(k) is a reception signal vector with respect to the kth sub-carrier and H(k)⁺ is a pseudo inverse matrix of a channel response matrix with respect to the kth sub-carrier. The probabilistic ML result shown in Equation 12 is expressed as in Equation 13:

$$\operatorname*{argmax}_{H_i} Q^{DEM}(H_i|H_i^p) = \operatorname*{argmax}_{H_i} \sum_{d=1}^{D} \log\{f(Y_i^d|H_i,\tilde{X}^d)\} \quad \text{[Eqn. 13]}$$

$$f(Y_i^d|\tilde{X}^d, H_i^p)$$

$$= \operatorname*{argmin}_{H_i} \sum_{d=1}^{D} |Y_i^d - H_i\tilde{X}^d|^2$$

$$f(Y_i^d|\tilde{X}^d, H_i^p)$$

In Equation 13, $Q^{DEM}(H_i|H_i^p)$ is an expectation value of log $f(Y_i,\tilde{x}|H_i)$ when $\tilde{x}$ and $H_i^p$ are provided, $H_i$ is a channel response vector with respect to the ith reception antenna, $H_i^p$ is a channel response vector that is updated p times with respect to the ith reception antenna, D is the number of data signals included in a single block, $f(Y_i^d|H_i,\tilde{X}^d)$ is a conditional probability distribution of $Y_i^d$ when $H_i$ and $\tilde{X}^d$ are provided, $Y_i^d$ is the dth data signal received through the ith reception antenna and $\tilde{X}^d$ is a detection value of the dth transmission signal vector.

The Equation 13 is differentiated with respect to $H_i$ thereby obtaining a channel response value-updating formula of the DEM as in Equation 14:

$$H_i^{p+1} = \operatorname*{argmax}_{H_i} Q^{DEM}(H_i|H_i^p) \quad \text{[Eqn. 14]}$$

$$= \left[\sum_{d=1}^{D} \tilde{X}^d(\tilde{X}^d)^T f(Y_i^d|\tilde{X}^d, H_i^p)\right]^{-1} \times$$

$$\left[\sum_{d=1}^{D} Y_i^d(\tilde{X}^d)^T f(Y_i^d|\tilde{X}^d, H_i^p)\right]$$

In Equation 14, $H_i^p$ is a channel response vector that is updated p times with respect to the ith reception antenna, $Q^{DEM}(H_i|H_i^p)$ is an expectation value of log $f(Y_i,\tilde{x}|H_i)$ when $\tilde{X}$ and $H_i^p$ are provided, $H_i$ is a channel response vector with respect to the ith reception antenna, D is the number of data signals included in a single block, $\tilde{X}^d$ is a detection value of the dth transmission signal vector and $Y_i^d$ refers to the dth data signal received through the ith reception antenna.

The Equation 14 is based on the relation between the channel response, a transmission signal and a reception signal as shown in Equation 15:

$$H_i = \left[\tilde{X}^d(\tilde{X}^d)^T\right]^{-1}\left[Y_i^d(\tilde{X}^d)^T\right] \quad \text{[Eqn. 15]}$$

In Equation 15, $H_i$ is a channel response vector with respect to the ith antenna, $\tilde{X}^d$ is a detection value of the dth transmission signal vector and $Y_i^d$ is the dth data signal received through the ith reception antenna.

According to Equation 15, a channel response value can be calculated by forming a polynomial expression with D numbers of reception signals. However, if there is an error in the detection value of the transmission signal vector, an accurate channel response value cannot be obtained. Therefore, a probability distribution of the detected signal is used as a weight value as shown in Equation 14.

As shown in Equation 14, the DEM according to the present invention uses only the MIMO signal detection result and is thus relatively less complex in operation than the EM which detects all the possible combinations. As the DEM according to the present invention detects a signal by using a plurality of reception antennas simultaneously as shown in Equation 12, it can solve the problem which occurs in estimating a plurality of channel responses with respect to the plurality of transmission antennas from a single reception antenna. Also, the DEM performs a normalization by using all the data signals in the block. In the DEM, a weight value of each channel response varies in consideration of a momentary change of the noise instead of being equally assigned as in the EM.

After the channel response is obtained as described above, a noise reducing method may be additionally applied. The noise reducing method estimates an impulse response length of a time domain of a channel, and inserts one or more zeros into a component longer than the impulse response length, thereby reducing noises. The noise reducing method is shown in Equation 16:

$$\overline{H}_{m+1} = FF^+\overline{H}_m \quad \text{[Eqn. 16]}$$

In Equation 16, $\overline{H}_m$ is a frequency domain channel response that is updated m times, F is front rows as much as the maximum delay value of a channel among Fast Fourier Transform (FFT) matrix and F⁺ is a pseudo inverse matrix of F.

A more accurate channel response value is obtained by adding the noise reducing method, and the foregoing process is repeated to converge to a more accurate channel response value. That is, a subsequently-received signal is detected by using updated channel response value, and the channel response value is updated again through the same process. Here, the number of repetition varies depending on the exemplary embodiments of the present invention.

Hereinafter, the configuration and operation of a reception terminal estimating a channel response value according to the DEM of the present invention will be described in detail with reference to the accompanying drawings.

FIG. 2 is a block diagram of a reception terminal in a multi antenna wireless communication system according to an exemplary embodiment of the present invention.

As illustrated in FIG. 2, the reception terminal includes a plurality of radio frequency (RF) receivers 202-1 to 202-R, a plurality of OFDM demodulators 204-1 to 204-R, a plurality of sub-carrier demappers 206-1 to 206-R, a channel estimator 208, a signal detector 210, a demodulator 212, a decoder 214, a transmission signal generator 216, a DEM operator 218 and a noise remover 220.

Each of the plurality of RF receivers 202-1 to 202-R converts an RF band signal received through an antenna into a baseband signal. Each of the plurality of OFDM demodulators 204-1 to 204-R divides a signal supplied from a corresponding RF receiver 202 in an OFDM symbol unit, removes CP and then restores sub-carrier signals through FFT operation. Each of the plurality of sub-carrier demappers 206-1 to 206-R extracts and divides the sub-carrier signals supplied from corresponding OFDM demodulator 204. For example, each of the plurality of sub-carrier demappers 206-1 to 206-R extracts a pilot signal or a preamble signal to supply to the channel estimator 208, and extracts a data signal to supply to the signal detector 210.

The channel estimator 208 estimates a channel response value with a transmission terminal by using a predetermined signal such as a pilot signal or a preamble signal. The channel response value is supplied to the signal detector 210 and the DEM operator 218. The signal detector 210 detects transmission signals from reception signals by using the channel response value initially estimated by the channel estimator 208, and detects transmission signals again by using the updated channel response value supplied by the DEM operator 218 or the noise remover 220 according to the present invention. Here, the detection method to be used varies according to exemplary embodiments, and for example, ZF or ML may be employed. If the ZF or ML is used, the transmission signal detection is performed as shown in Equation 12.

The demodulator 212 converts the detected transmission signal supplied by the signal detector 210 into an encoded bit stream. The decoder 214, which performs a Forward Error Correction (FEC), performs error detection and correction of the encoded bit stream supplied by the demodulator 212, to convert the bit stream into an information bit stream. The transmission signal generator 216 generates error-corrected, detected transmission signals by using the information bit stream. That is, the transmission signal generator 216 encodes and modulates the information bit stream according to the encoding method and modulation method identical to those used in the transmission terminal, thereby generating a transmission signal.

The DEM operator 218 updates a channel response value initially estimated by the channel estimator 208 by using the detected transmission signals, a detection accuracy and reception signals. That is, the DEM operator 218 calculates the detection accuracy of the respective detected transmission signals by using a distance between the detected transmission signals and the reception signals, thereby obtaining a weight value for each detected transmission signal. The DEM operator 218 updates the channel response value by accumulating the values obtained by multiplying the channel response value by the weight value in a single block. Here, the weight value is a conditional probability distribution of each reception signal on the condition of the channel response value and the detected transmission signals. For example, the conditional probability distribution of the respective reception signals is calculated by Equation 11, and the channel response value is updated by Equation 14. The DEM operator 218 repeatedly updates the channel response value that is updated by itself, as well as the initially-estimated channel response value. In every repetition step, the DEM operator 218 uses a transmission signal which is newly detected in a previous repetition step, and the number of repetition varies according to exemplary embodiments of the present invention.

The noise remover 220 removes noise components included in the channel response value that is updated by the DEM operator 218. That is, the noise remover 220 estimates an impulse response length of a time domain of a channel and inserts one or more zeroes to the component longer than the impulse response length. For example, the noise remover 220 removes noises as shown in Equation 16.

According to an exemplary embodiment with reference to FIG. 2, the reception terminal includes the transmission signal generator 216 and the noise remover 220. According to another exemplary embodiment of the present invention, however, the reception terminal may not include the transmission signal generator 216. In this case, the DEM operator 218 uses a transmission signal detected by the signal detector 210 rather than a detected transmission signal. Also, the reception terminal may not include the noise remover 220. In this case, the DEM operator 218 supplies an updated channel response value to the signal detector 210. That is, according to another exemplary embodiment of the present invention, the reception terminal may not include at least one of the transmission signal generator 216 and the noise remover 220.

FIG. 3 illustrates a channel estimation process of the reception terminal in the multi antenna wireless communication system according to the exemplary embodiment of the present invention.

Referring to FIG. 3, the reception terminal initially estimates the channel response value by using the predetermined signal such as the pilot signal or the preamble signal in step 301.

After initially estimating the channel response value, the reception terminal proceeds to step 303 and detects the transmission signals by using the initially-estimated channel response value. Here, the detection method to be used varies according to exemplary embodiments, and for example, ZF or ML may be used. If the ZF or ML is used, the transmission signal is detected by Equation 12.

After detecting the transmission signals, the reception terminal demodulates and decodes the detected transmission signals and converts them into an information bit stream in step 305. That is, the reception terminal converts the detected transmission signals into the encoded bit stream, and performs the error detection and correction from the encoded bit stream, thereby converting the transmission signals into an information bit stream.

The reception terminal proceeds to step 307 and encodes and modulates the information bit stream according to the encoding method and modulation method identical to those used in the transmission terminal, thereby generating error-corrected, detected transmission signals.

After generating the error-corrected, detected transmission signals, the reception terminal proceeds to step 309 and updates the channel response value for each antenna by using the reception signals, detected transmission signals and detection accuracy. That is, the reception terminal calculates the detection accuracy of the respective detected transmission signals by using the distance between the detected transmission signals and the reception signals, thereby obtaining the weight value for each transmission signal. And the reception terminal updates the channel response value by accumulating the values obtained by multiplying the channel response value by the weight value in a single block. Here, the weight value is a conditional probability distribution of reception signals on the condition of the channel response value and detected transmission signals. For example, the conditional probability distribution of the respective reception signals is expressed by Equation 11, and the channel response value is updated by Equation 14.

After updating the channel response value, the reception terminal removes noise components from the updated channel response value in step 311. That is, the reception terminal estimates the impulse response length of the time domain of the channel, and inserts one or more zeroes to the component longer than the impulse response value. For example, the reception terminal removes noises as in Equation 16.

After removing noises, the reception terminal determines in step 313 whether or not the repetitive updates of the channel response value have been completed. That is, the reception terminal determines whether the channel response value has been updated as many times as the set number. The number of repetition varies according to exemplary embodiments of the present invention. If the repetitive updates are completed, the reception terminal ends this process.

If the repetitive updates have not been completed, the reception terminal detects a transmission signal again by using the updated, error-removed channel response value in step 315, and then returns to step 305.

According to the exemplary embodiment with reference to FIG. 3, the reception terminal performs the step 307 of generating a transmission signal and the step 311 of removing noises. According to another exemplary embodiment of the present invention, however, the step 307 may be omitted. In this case, the reception terminal uses in step 309 the transmission signal detected in step 303. Alternatively, the step 311 may be omitted. In this case, the reception terminal uses in step 315 the channel response value updated in step 309. That is, according to another exemplary embodiment of the present invention, the reception terminal may omit at least one of the steps 307 and 311.

Hereinafter, performance of the DEM will be described with reference to a simulation result of a system employing the EM and DEM.

Table 1 and Table 2 illustrate simulation results based on the assumption that the modulation method is a binary phase shift keying (BPSK), the number of data signals in the data block is six, the initially-estimated channel response value is 0.6+0.9j, and an actual channel response value is 0.7+0.7j, and under the circumstance where the transmitted signal is 1, and signal to noise ratio (SNR) is 0 dB.

TABLE 1

| | Symbol | | | | | |
|---|---|---|---|---|---|---|
| | 1 | 2 | 3 | 4 | 5 | 6 |
| $Y_i^d$ | 0.3030 + 0.3746j | 0.7898 + 0.3261j | 0.9640 + 0.4057j | 0.9922 − 1.0179j | 1.4818 + 0.6461j | 1.1040 + 0.9179j |
| Constellation | −1     1 | −1     1 | −1     1 | −1     1 | −1     1 | −1     1 |
| $F(Y_i^{d|H_i^p, Xd})$ | 0.0470  0.1327 | 0.0286  0.1326 | 0.0200  0.1318 | 0.0445  0.0234 | 0.0055  0.1045 | 0.0070  0.0401 |
| $f(Y_o^{d|H_i^p})$ | 0.1796 | 0.1612 | 0.1518 | 0.0679 | 0.1100 | 0.1473 |
| $H_i^{p+1}$ | | | 0.5645 + 0.4023j | | | |

TABLE 2

| | symbol | | | | | |
|---|---|---|---|---|---|---|
| | 1 | 2 | 3 | 4 | 5 | 6 |
| $Y_i^d$ | 0.3030 + 0.3746j | 0.7898 + 0.3261j | 0.9640 + 0.4057j | 0.9922 − 1.0179j | 1.4818 + 0.6461j | 1.1040 + 0.9179j |
| | 1 | 1 | 1 | −1 | 1 | 1 |
| | 0.1327 | 0.1326 | 0.1318 | 0.0234 | 0.1045 | 0.1401 |
| Weight Value | 0.9996 | 0.9961 | 0.9606 | 0.3242 | 0.7612 | 1.0212 |
| $H_i^{p+1}$ | | | 0.7831 + 0.5652j | | | |

In Table 2, the weight value refers to a weight value which affects the update of the channel response value in Equation 14. According to the EM, since an identical weight value is applied to the received signals, a weight value of the sum of normalized values is always 1. As shown in Table 1 and Table 2, if the fourth signal includes a lot of noises, a weight value normalized in the EM is 0.6551 when the signal of zero is transmitted, and is 0.3449 when a signal of 1 is transmitted. That is, as a relatively large weight value is applied to the fourth signal, the estimation performance is deteriorated. However, according to the DEM, the normalization is performed by using all the signals. Hence, the fourth signal including a lot of noises has a smaller weight value, and a signal including a small noise has a larger weight value. Referring to the estimation result, the EM estimated 0.5645+ 0.4023j, whereas the DEM estimated 0.7831+0.5652j. That is, it is confirmed that estimation performance of the DEM is superior to the EM when estimation MSE (mean square error) is 0.1070 and 0.0251, respectively.

Table 3 and Table 4 illustrate simulation results based on the assumption that the modulation method is a binary phase shift keying (BPSK), the number of data signals included in the data block is six, an initially-estimated channel response value is 0.6+0.9j, an actual channel response value is 0.7+ 0.7j, and under the circumstance where a transmitted signal is 1 and SNR is 0 dB.

TABLE 3

| | symbol | | | | | | | | | | | |
|---|---|---|---|---|---|---|---|---|---|---|---|---|
| | 1 | | 2 | | 3 | | 4 | | 5 | | 6 | |
| $Y_i^d$ | 0.720 + 0.647j | | 0.727 + 0.701j | | 0.709 + 0.699j | | 0.694 + 0.705j | | 0.706 + 0.701j | | 0.702 + 0.665j | |
| Constellation | −1 | 1 | −1 | 1 | −1 | 1 | −1 | 1 | −1 | 1 | −1 | 1 |
| $f(Y_i^{d\|Hip,Xd})$ | 0.56e−91 | 0.6774 | 2.11e−93 | 0.9744 | 3.02e−92 | 1.1583 | 8.28e−92 | 1.5102 | 3.28e−92 | 1.2522 | 1.63e−89 | 0.5980 |
| $f(Y_o^{d\|Hip})$ | 0.6774 | | 0.9744 | | 0.1583 | | 1.5102 | | 0.2522 | | 0.5980 | |
| $H_i^{p+1}$ | 0.7098 + 0.6915j | | | | | | | | | | | |

TABLE 4

| | symbol | | | | | |
|---|---|---|---|---|---|---|
| | 1 | 2 | 3 | 4 | 5 | 6 |
| $Y_i^d$ | 0.720 + 0.647j | 0.727 + 0.701j | 0.709 + 0.699j | 0.694 + 0.705j | 0.706 + 0.701j | 0.702 + 0.665j |
| | 1 | 1 | 1 | 1 | 1 | 1 |
| | 0.6774 | 0.974 | 1.1583 | 1.5102 | 1.2522 | 0.5980 |
| Weight | 0.5489 | 0.7895 | 0.9586 | 0.2237 | 1.0147 | 0.4546 |
| $H_i^{p+1}$ | 0.7082 + 0.6955j | | | | | |

In the case of employing the EM, since the weight values of all reception signals are identical, a weight value of the normalized value is 1 without considering instant noises. In the case of employing the DEM, however, as the normalization is performed by using all reception signals, a weight value is assigned in consideration of the amount of momentary noises. That is, if the amount of noises is large, a weight value becomes smaller, whereas if the amount of noises is small, the weight value becomes larger. Referring to Table 3 and Table 4, the EM estimates 0.7098+0.6915j while the DEM estimates 0.7082+0.6955j. That is, it is confirmed that the DEM has higher estimation performance than the EM does at the points where channel estimation MSE is 1.6670e−4 and 8.7302e−5, respectively.

Table 5 represents the frequencies of complex number multiplication of the EM, the DD and the DEM methods.

TABLE 5

| | DEM | EM | DD |
|---|---|---|---|
| T = 3, R = 4, P = 2, D = 12, \|C\| = 4, M = 2 | 5622 | 71824 | 1260 |
| T = 3, R = 4, P = 2, D = 12, \|C\| = 16, M = 2 | 5622 | 4333888 | 1260 |
| T = 3, R = 4, P = 1, D = 12, \|C\| = 16, M = 2 | 3702 | 2167456 | 1260 |

In Table 5, 'T' refers to the number of transmission antennas, 'R' is the number of reception antennas, 'P' is the frequency of repetitive updates, 'D' is the number of data signals included in a block, |C| is the number of constellation points, and 'M' is the frequency of channel estimation, i.e. the number of blocks to calculate a channel response. As shown in Table 5, the operational complexity of the DEM is higher than that of the DD, but much lower than that of the EM. The operational complexity of the EM increases exponentially depending on the size of the constellation, while the operational complexity of the DEM is not related to the size of the constellation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A reception terminal apparatus in a wireless communication system, the apparatus comprising:

an estimator configured to perform an initial estimation of a channel response value by using a predetermined signal among reception signals;

a detector configured to detect transmission signals by using the channel response value; and an operator configured to update the channel response value by using the detected transmission signals, a detection accuracy and the reception signals, wherein the operator calculates the detection accuracy of the respective detected transmission signals by using a distance between the detected transmission signals and the reception signals to obtain a weight value for each detected transmission signal, and updates the channel response value by accumulating the channel response value multiplied by the weight value in a single data block, and wherein the operator calculates a conditional probability distribution of the respective reception signals on a condition of the channel response value and the detected transmission signals, thereby obtaining the weight value for each detected transmission signal.

2. The apparatus of claim 1, wherein the operator calculates the conditional probability distribution of the respective reception signals according to a following equation, $$f(Y_i^d \mid \tilde{x}^d, H_i^p) = \frac{1}{2\pi\sigma^2} \exp\left\{-\frac{1}{2\sigma^2}\left|Y_i^d - H_i^p \tilde{X}^d\right|^2\right\}$$

wherein, $f(Y_i^d|\tilde{x}^d,H_i^p)$ is a conditional probability distribution of $Y_i^d$ when $\tilde{X}^d$ and $H_i^p$ are provided, $Y_i^d$ is a dth data signal received through an ith reception antenna, $\tilde{X}^d$ is a detection value of a dth transmission signal vector, $Y_i^d$ is the dth data signal received through the ith reception antenna, and $H_i^p$ is a channel response vector that is updated p times with respect to the ith antenna and $\sigma^2$ is a noise variance.

3. The apparatus of claim 2, wherein the operator updates the channel response value according to a following equation, $$H_i^{p+1} = \left[\sum_{d=1}^{D} \tilde{X}^d (\tilde{X}^d)^T f(Y_i^d | \tilde{X}^d, H_i^p)\right]^{-1} \times \left[\sum_{d=1}^{D} Y_i^d (\tilde{X}^d)^T f(Y_i^d | \tilde{X}^d, H_i^p)\right]$$

wherein $Q^{DEM}(H_i|H_i^p)$ is an expectation value of log $f(Y_i, \tilde{x}|H_i)$ when $\tilde{X}^d$ and $H_i^p$ are provided, $H_i$ is a channel response vector with respect to the ith reception antenna, and D is a number of data signals included in a single data block.

4. The apparatus of claim 1, wherein the operator updates the channel response value by using the reception signals within a coherence time and a coherence bandwidth identical to a predetermined signal used for the initial estimation.

5. The apparatus of claim 1, further comprising:
a demodulator configured to convert a transmission signal detected by the detector into an encoded bit stream;
a decoder configured to detect and correct errors of the encoded bit stream, and convert the encoded bit stream into an information bit stream; and
a generator configured to encode and modulate the information bit stream according to an encoding method and a modulation method identical to those used by a transmission terminal to obtain an error-corrected, detected transmission signal, and configured to supply the error-corrected, detected transmission signal to the operator.

6. The apparatus of claim 1, further comprising a remover configured to remove a noise component from the updated channel response value by inserting one or more zeros to a component longer than an impulse response length of a time domain of a channel.

7. The apparatus of claim 6, wherein the remover removes the noise component according to a following formula, $$\overline{H}_{m+1} = FF^+ \overline{H}_m$$

wherein, $\overline{H}_m$ is a frequency domain channel response that is updated m times, F is front rows as much as a maximum delay value of a channel among a fast fourier transform (FFT) matrix, and $F^+$ is a pseudo inverse matrix of F.

8. The apparatus of claim 1, wherein the detector redetects the transmission signals by using the updated channel response value, and the operator repetitively updates the channel response value by using the redetected transmission signals, a detection accuracy of the redetected transmission signals and the reception signals.

9. The apparatus of claim 1, wherein the detector detects the transmission signals according to a zero forcing (ZF) method or a maximum likelihood (ML) method.

10. A channel estimation method of a reception terminal in a wireless communication system, the method comprising:
initially estimating a channel response value by using a predetermined signal among reception signals;
detecting transmission signals by using the channel response value; and
updating the channel response value by calculating a detection accuracy of each detected transmission signals by using a distance between the detected transmission signals and the reception signals, to obtain a weight value for each detected transmission signal, and updating the channel response value by accumulating the channel response value multiplied by the weight value in a single data block,
wherein updating the channel response value includes obtaining a weight value of each detected transmission signal by calculating a conditional probability distribution of each reception signal on a condition of the channel response value and the detected transmission signal.

11. The method of claim 10, wherein the conditional probability distribution of each reception signal is calculated according to a following formula, $$f(Y_i^d | \tilde{x}^d, H_i^p) = \frac{1}{2\pi\sigma^2} \exp\left\{-\frac{1}{2\sigma^2}|Y_i^d - H_i^p \tilde{x}^d|^2\right\}$$

wherein, $f(Y_i^d|\tilde{x}^d, H_i^p)$ is a conditional probability distribution of $Y_i^d$ when $\tilde{X}^d$ and $H_i^p$ are provided, $Y_i^d$ is a dth data signal receive through an ith reception antenna, $\tilde{X}^d$ is a detection value of a dth transmission signal vector, $H_i^p$ is a channel response vector that is updated p times with respect to the ith antenna, and $\sigma^2$ is a noise variance.

12. The method of claim 11, wherein the channel response value is updated according to a following formula, $$H_i^{p+1} = \left[\sum_{d=1}^{D} \tilde{X}^d (\tilde{X}^d)^T f(Y_i^d | \tilde{X}^d, H_i^p)\right]^{-1} \times \left[\sum_{d=1}^{D} Y_i^d (\tilde{X}^d)^T f(Y_i^d | \tilde{X}^d, H_i^p)\right]$$

wherein, $H_i^p$ is a channel response vector that is updated p times with respect to an ith reception antenna, $Q^{DEM}(H_i|H_i^p)$ is an expectation value of log $f(Y_i,\tilde{x}|H_i)$ when $\tilde{X}^d$ and $H_i^p$ are provided, $H_i$ is a channel response vector with respect to the ith reception antenna, D is a number of data signals included in a single data block, $\tilde{X}^d$ is a detection value of a dth transmission signal vector and $Y_i^d$ is a dth data signal received through the ith reception antenna.

13. The method of claim 10, wherein the channel response value is updated by using reception signals within a coherence time and a coherence bandwidth identical to a predetermined signal used for the initial estimation.

14. The method of claim 10, further comprising:
converting the transmission signal detected by the detector into an encoded bit stream and detecting and correcting errors in the encoded bit stream, to convert the encoded bit stream into an information bit stream; and
obtaining error-corrected, detected transmission signals by encoding and modulating the information bit stream according to an encoding method and a modulation method identical to those used by a transmission terminal.

15. The method of claim 10, further comprising removing a noise component from the updated channel response value by inserting one or more zeros to a component longer than an impulse response length of a time domain of a channel.

16. The method of claim 15, wherein the noise component is removed according to a following formula, $$\overline{H}_{m+1} = FF^+ \overline{H}_m$$

wherein, $\overline{H}_m$ is a frequency domain channel response that is updated m times, F is front rows as much as a maximum delay value of a channel among a fast fourier transform (FFT) matrix and $F^+$ is a pseudo inverse matrix of F.

17. The method of claim 10, further comprising:
redetecting transmission signals by using the updated channel response value; and
repetitively updating the channel response value by using the redetected transmission signals, a detection accuracy for each of the redetected transmission signals and reception signals.

18. The method of claim 10, wherein the transmission signals are detected according to a zero forcing method or a maximum likelihood method.

* * * * *